US 12,488,179 B2

(12) United States Patent
Bandel et al.

(10) Patent No.: US 12,488,179 B2
(45) Date of Patent: Dec. 2, 2025

(54) QUALITY CONTROLLED PARAPHRASE GENERATION

(71) Applicant: International Business Machines Corporation, Armonk, NY (US)

(72) Inventors: Elron Bandel, Jerusalem (IL); Liat Ein-Dor, Tel-Aviv (IL); Ranit Aharonov, Ramat Hasharon (IL); Michal Shmueli-Scheuer, Tel-Aviv (IL); Ilya Shnayderman, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 18/197,120

(22) Filed: May 15, 2023

(65) Prior Publication Data

US 2024/0386188 A1   Nov. 21, 2024

(51) Int. Cl.
*G06F 40/166* (2020.01)
*G06F 40/284* (2020.01)
*G06F 40/30* (2020.01)

(52) U.S. Cl.
CPC .......... *G06F 40/166* (2020.01); *G06F 40/284* (2020.01); *G06F 40/30* (2020.01)

(58) Field of Classification Search
None
See application file for complete search history.

(56) References Cited

U.S. PATENT DOCUMENTS

| 11,042,712 | B2 | 6/2021 | Prakash |
| 11,328,017 | B2 | 5/2022 | Gupta |
| 2004/0088156 | A1* | 5/2004 | Kanagasabai ......... G06F 40/211 704/9 |
| 2018/0061408 | A1 | 3/2018 | Andreas |
| 2018/0329882 | A1* | 11/2018 | Bennett ................... G06N 20/00 |
| 2019/0042663 | A1* | 2/2019 | Gupta ..................... G06F 40/40 |
| 2020/0250377 | A1 | 8/2020 | Jiang |
| 2022/0067285 | A1* | 3/2022 | Sellam .................. G06F 40/289 |

OTHER PUBLICATIONS

A. Chitra and A. Rajkumar, "Evolutionary approach for building efficient Paraphrase Recognizers," 2011 World Congress on Information and Communication Technologies, Mumbai, India, 2011, pp. 661-666. (Year: 2011).*

(Continued)

*Primary Examiner* — Frank D Mills
(74) *Attorney, Agent, or Firm* — Elliot J. Shine

(57) ABSTRACT

A computer-implemented method including: receiving, as input, a dataset comprising training pairs (s, t), wherein each training pair comprises (i) a source sentence s and (ii) a target paraphrase t of the source sentences; at a training stage, training a machine learning model on the dataset, to obtain a trained quality-controlled paraphrase generator model, wherein during the training stage, each of the training pairs is associated with a predicted control vector representing a predicted paraphrase quality of the source sentence in the training pair; and at an inference stage, inferencing the trained quality-controlled paraphrase generator model on an input sentence, wherein the input sentence is associated with an input quality control vector, to obtain an output paraphrase of the input sentence which conforms to the quality control vector.

21 Claims, 9 Drawing Sheets

(56) References Cited

OTHER PUBLICATIONS

X. Zhang, W. Rong, J. Liu, C. Tian and Z. Xiong, "Convolution neural network based syntactic and semantic aware paraphrase identification," 2017 International Joint Conference on Neural Networks (IJCNN), Anchorage, AK, USA, 2017, pp. 2158-2163. (Year: 2017).*
Ankush Gupta et al, "A Deep Generative Framework for Paraphrase Generation"; Online at: https://arxiv.org/pdf/1709.05074.pdf, Sep. 15, 2017.
Elron Bandel et al, "Quality Controlled Paraphrase Generation"; Online at: https://arxiv.org/abs/2203.10940, Apr. 1, 2022.
Mingda Chen et al, "Controllable Paraphrase Generation with a Syntactic Exemplar"; In Proceedings of the 57th Annual Meeting of the Association for Computational Linguistics, pp. 5972-5984, Jul. 2019.
Sonal Garg et al, "Unsupervised Contextual Paraphrase Generation using Lexical Control and Reinforcement Learning"; Online at: https://arxiv.org/abs/2103.12777, Mar. 23, 2021.
Tanya Goyal et al, "Neural Syntactic Preordering for Controlled Paraphrase Generation"; In Proceedings of the 58th Annual Meeting of the Association for Computational Linguistics, pp. 238-252, Jul. 5-10, 2020.
Bao et al., "Generating Sentences from Disentangled Syntactic and Semantic Spaces", arXiv:1907.05789v1 [cs.CL], Jul. 6, 2019, 11 pages.
Callison-Burch et al., "ParaMetric: An Automatic Evaluation Metric for Paraphrasing", Proceedings of the 22nd International Conference on Computational Linguistics (Coling 2008), Aug. 2008, pp. 97-104.
Clark et al., "Electra: Pre-training Text Encoders as Discriminators Rather than Generators", arXiv:2003.10555v1 [cs.CL], Mar. 23, 2020, 18 pages.
Hosking et al., "Factorising Meaning and Form for Intent-Preserving Paraphrasing", arXiv:2105.15053v1 [cs.CL], May 31, 2021, 14 pages.
Iyyer et al., "Adversarial Example Generation with Syntactically Controlled Paraphrase Networks", arXiv:1804.06059v1 [cs.CL], Apr. 17, 2018, 11 pages.
Li et al., "Transformers to Learn Hierarchical Contexts in Multi-party Dialogue for Span-based Question Answering", Proceedings of the 58th Annual Meeting of the Association for Computational Linguistics, Jul. 2020, pp. 5709-5714.
Liu et al., "Unsupervised Paraphrasing by Simulated Annealing", roceedings of the 58th Annual Meeting of the Association for Computational Linguistics, Jul. 5-10, 2020, pp. 302-312.
Nicula et al., "Automated Paraphrase Quality Assessment Using Language Models and Transfer Learning", Computers, Dec. 6, 2021, 16 pages.
Niu et al., "Unsupervised Paraphrasing with Pretrained Language Models", arXiv:2010.12885v2 [cs.CL], Sep. 10, 2021, 15 pages.
Park et al., "Paraphrase Diversification Using Counterfactual Debiasing", AAAI Technical Track: Natural Language Processing, Jul. 17, 2019, pp. 6883-6891.
Qian et al., "Exploring Diverse Expressions for Paraphrase Generation", Proceedings of the 2019 Conference on Empirical Methods in Natural Language Processing and the 9th International Joint Conference on Natural Language Processing (EMNLP-IJCNLP), Nov. 2019, pp. 3173-3182.
Raffel et al., "Exploring the limits of transfer learning with a unified text-to-text transformer", arXiv:1910.10683v4 [cs.LG], Sep. 19, 2023, 67 pages.
Siddique et al., "Unsupervised Paraphrasing via Deep Reinforcement Learning", arXiv:2007.02244 [cs.CL], Jul. 5, 2020, 10 pages.
Thompson et al., "Paraphrase Generation as Zero-Shot Multilingual Translation: Disentangling Semantic Similarity from Lexical and Syntactic Diversity", arXiv:2008.04935v2 [cs.CL], Oct. 28, 2020, 10 pages.
Vijayakumar et al., "Diverse Beam Search for Improved Description of Complex Scenes", Thirty-Second AAAI Conference on Artificial Intelligence, Apr. 27, 2018, pp. 7371-7379.
Zeng et al., "User-Oriented Paraphrase Generation With Keywords Controlled Network", IEEE Access, Jun. 14, 2019, pp. 80542-80551.

* cited by examiner

QUALITY CONTROLLED PARAPHRASE GENERATION

BACKGROUND

The present invention relates to the field of natural language processing, and more specifically, to techniques and mechanisms for automated paraphrase generation.

Paraphrases are texts that convey the same meaning while using different words or sentence structures. Given a sentence, paraphrase generation aims to create one or more paraphrases that can have a different wording or sentence structure from the original sentence, while preserving the original meaning.

Paraphrase generation is an important technique in natural language processing, that has been widely used in various downstream tasks, including question answering, machine translation, text summarization, data augmentation, and adversarial learning. However, not all paraphrases are equally useful. For most real-world applications, paraphrases which are too similar to the original sentence are of limited value. Paraphrases with high linguistic diversity, i.e., those having large syntactic or lexical differences from the original sentence, are more beneficial to the robustness and accuracy of automatic text evaluation and classification, and can avoid the blandness caused by repetitive patterns.

The quality of paraphrases is often evaluated based on both the semantic similarity and the lexical and/or syntactic diversity of the paraphrase, when compared to the original sentence. These conflicting criteria make automated generating of high quality paraphrases a challenging task, because as the linguistic diversity increases, it becomes more difficult to preserve sentence meaning.

Recent approaches for automated paraphrase generation attempt to control specific aspects of the paraphrase, such as its syntactic tree. However, these approaches often require providing the model with very specific information regarding the target sentence, such as its parse tree or the list of keywords it must contain. This not only complicates the usage of those methods, and limits their scalability, but also hinders their coverage.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a computer-implemented method comprising: receiving, as input, a dataset comprising training pairs (s, t), wherein each training pair comprises (i) a source sentence s and (ii) a target paraphrase t of the source sentences; at a training stage, training a machine learning model on the dataset, to obtain a trained quality-controlled paraphrase generator model, wherein during the training stage, each of the training pairs is associated with a predicted control vector representing a predicted paraphrase quality of the source sentence in the training pair; and at an inference stage, inferencing the trained quality-controlled paraphrase generator model on an input sentence, wherein the input sentence is associated with an input quality control vector, to obtain an output paraphrase of the input sentence which conforms to the quality control vector.

There is also provided, in an embodiment, a system comprising at least one hardware processor; and a non-transitory computer-readable storage medium having program code embodied therewith, the program code executable by the at least one hardware processor to: receive, as input, a dataset comprising training pairs (s, t), wherein each training pair comprises (i) a source sentence s and (ii) a target paraphrase/of the source sentences, at a training stage, train a machine learning model on the dataset, to obtain a trained quality-controlled paraphrase generator model, wherein during the training stage, each of the training pairs is associated with a predicted control vector representing a predicted paraphrase quality of the source sentence in the training pair, and at an inference stage, inference the trained quality-controlled paraphrase generator model on an input sentence, wherein the input sentence is associated with an input quality control vector, to obtain an output paraphrase of the input sentence which conforms to the quality control vector.

There is further provided, in an embodiment, a computer program product comprising a non-transitory computer-readable storage medium having program code embodied therewith, the program code executable by at least one hardware processor to: receive, as input, a dataset comprising training pairs (s, t), wherein each training pair comprises (i) a source sentence s and (ii) a target paraphrase/of the source sentences; at a training stage, train a machine learning model on the dataset, to obtain a trained quality-controlled paraphrase generator model, wherein during the training stage, each of the training pairs is associated with a predicted control vector representing a predicted paraphrase quality of the source sentence in the training pair; and at an inference stage, inference the trained quality-controlled paraphrase generator model on an input sentence, wherein the input sentence is associated with an input quality control vector, to obtain an output paraphrase of the input sentence which conforms to the quality control vector.

In some embodiments, the input quality control vector is a three-dimensional vector representing (i) desired semantic similarity, (ii) desired syntactic distance, and (iii) desired lexical distance, of the output paraphrase relative to the input sentence.

In some embodiments, the machine learning model comprises a quality predictor configured to predict expected quality values of paraphrases of a sentence, wherein, during the training stage, the quality predictor is configured to generate the predicted control vector.

In some embodiments, the quality predictor is a regressor configured to predict an expected quality of an input sentence s, In some embodiments, the input quality control vector represents a sum of (i) user-selected paraphrase quality values, and (ii) an offset vector representing a differential between (x) predicted paraphrase quality values of the input sentence, and (y) the user-selected paraphrase quality values.

In some embodiments, the predicted paraphrase quality values are generated by the quality predictor.

In some embodiments, the offset vector represents a sentence-independent level of difficulty of generating paraphrases for the input sentence, as reflected in a quality distribution of all paraphrases of the input sentence around a mean represented by the predicted paraphrase quality values of the input sentence.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
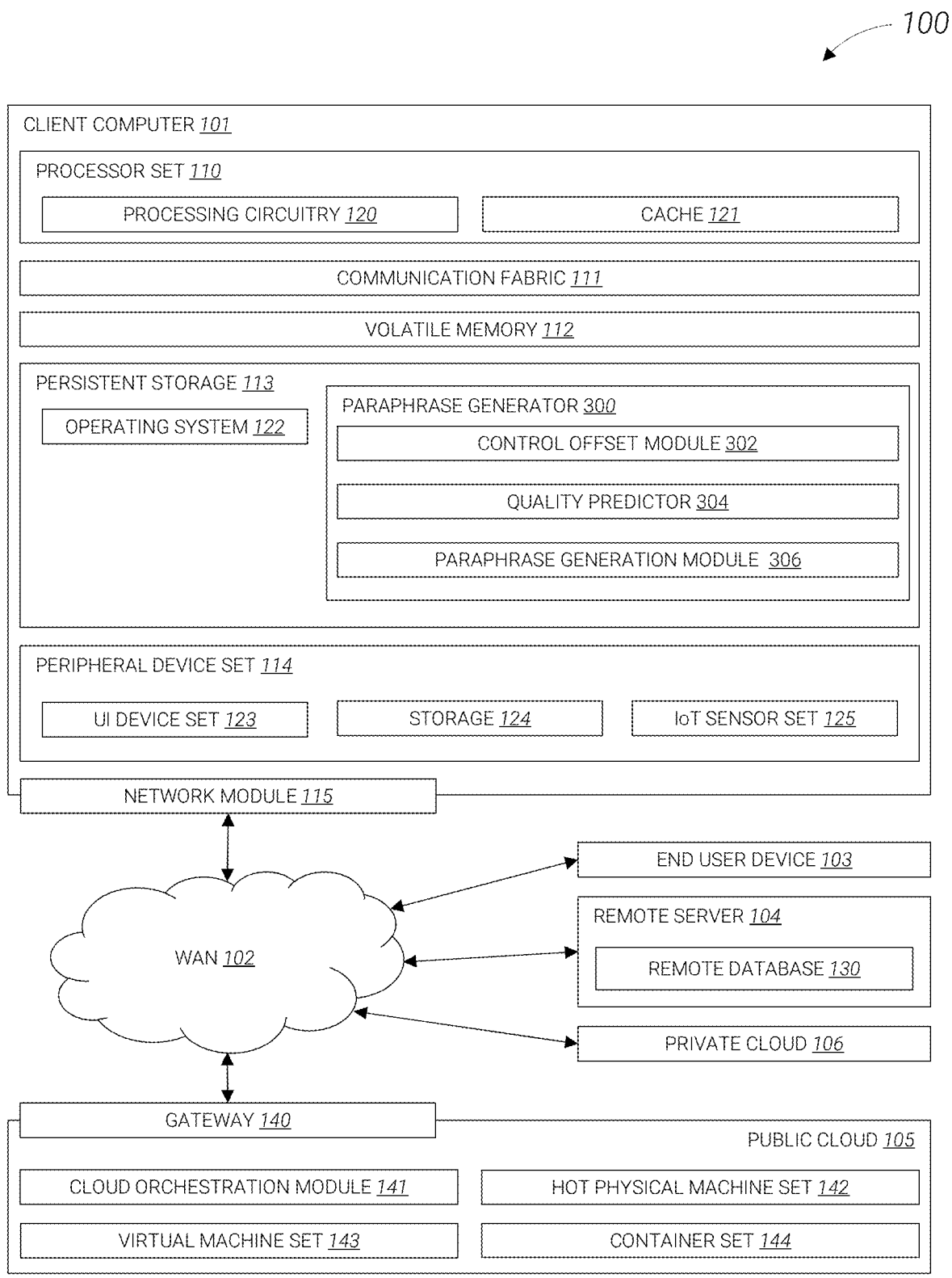
FIG. 1 is a block diagram of an exemplary computing environment for the execution of at least some of the computer code involved in performing the inventive methods.

Disclosed herein is a technique, embodied in a computer-implemented method, a system, and a computer program product, for automated quality-guided controlled paraphrase generation.

In some embodiments, the present technique provides for a paraphrase generator model, which allows for direct control of the quality of generated paraphrases. In some embodiments, the quality of paraphrases generated by the present paraphrase generator model is controlled based on input quality constraints, represented by a three-dimensional vector of semantic similarity, and syntactic and lexical distances. In some embodiments, given an input sentence and the three input quality constraints, the present paraphrase generator model generates a target sentence that conforms to the quality constraints. In some embodiments, the present paraphrase generator model is further configured to identify appropriate values for the quality constraints, for obtaining high-quality paraphrases.

In some embodiments, the present three quality constraints are simpler than those associated with known approaches, such as parse trees or keyword lists, and allow greater freedom to the present paraphrase generator model to choose how to attain the desired quality levels. By allowing direct control of the three quality constraints, the present paraphrase generator model can achieve greater flexibility with respect to the specific requirements of the task at hand. This can open up a range of generation possibilities, such as paraphrases of various flavors (e.g., syntactically vs. lexically diverse), quasi-paraphrases (with lower semantic similarity), and even non-paraphrases, which may be useful for downstream tasks (e.g., hard negative examples of sentences that are linguistically similar but have different meanings).

In some embodiments, the present paraphrase generator model can be trained on training data is of mixed quality, having sparse data in the high quality area. Nevertheless, the present paraphrase generator model is able to learn high quality paraphrasing behavior, such that the linguistic diversity of the generated paraphrases is increased, without decreasing the semantic similarity, as compared to the uncontrolled baseline model.

In some embodiments, the present paraphrase generator model is trained using a quality-aware training process, which can be viewed as multi-task learning, where each quality level is a separate task with its own accurate supervision. This stands in contrast to the common standard quality-agnostic approach, where low quality data is in fact used as a poor supervision for a model, which aims to generate higher quality output.

In some embodiments, the present paraphrase generator model further allows for selection of input control quality values. Generally, given an input sentence, not all paraphrase qualities are achievable, because some sentences are more amenable to paraphrasing than others. For example, sentences containing named entities and numbers are much more difficult to paraphrase while keeping sentence meaning, and thus the potential lexical diversity of paraphrases involving such terms is relatively limited. Forcing a paraphrase generator to conform to control quality values that are too high with respect to an input sentence, may lead to suboptimal quality of the resultant paraphrases. Accordingly, in some embodiments, the present technique provides for control values that can be adjusted based on the predicted expected quality of an input sentence. In some embodiments, the present technique provides for a method which optimizes the expected quality of the paraphrases generated by the present paraphrase generator. Accordingly, given a paraphrasing task requirements, the present method optimizes the input quality controls to yield the desired quality of paraphrases.

Reference is now made to FIG. 1, which depicts a block diagram of an exemplary computing environment 100, containing an example of an environment for the execution of at least some of the computer code involved in performing the inventive methods, such as paraphrase generator 300, comprising one or more modules, such as control offset module 302, quality predictor 304, and/or paraphrase generation module 306. In addition to paraphrase generator 300, computing environment 100 includes, for example, a computer 101, a wide area network (WAN) 102, an end user device (EUD) 103, a remote server 104, a public cloud 105, and/or a private cloud 106. In this example, computer 101 includes a processor set 110 (including processing circuitry 120 and a cache 121), a communication fabric 111, a volatile memory 112, a persistent storage 113 (including an operating system 122 and paraphrase generator 300, as identified above), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored by paraphrase generator 300 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in paraphrase generator 300 typically includes at least some of the computer code involved in performing the inventive methods.

Pheripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as a network interrace controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As will be seen, the techniques described herein may operate in conjunction within the environment illustrated in FIG. 1, in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 2:
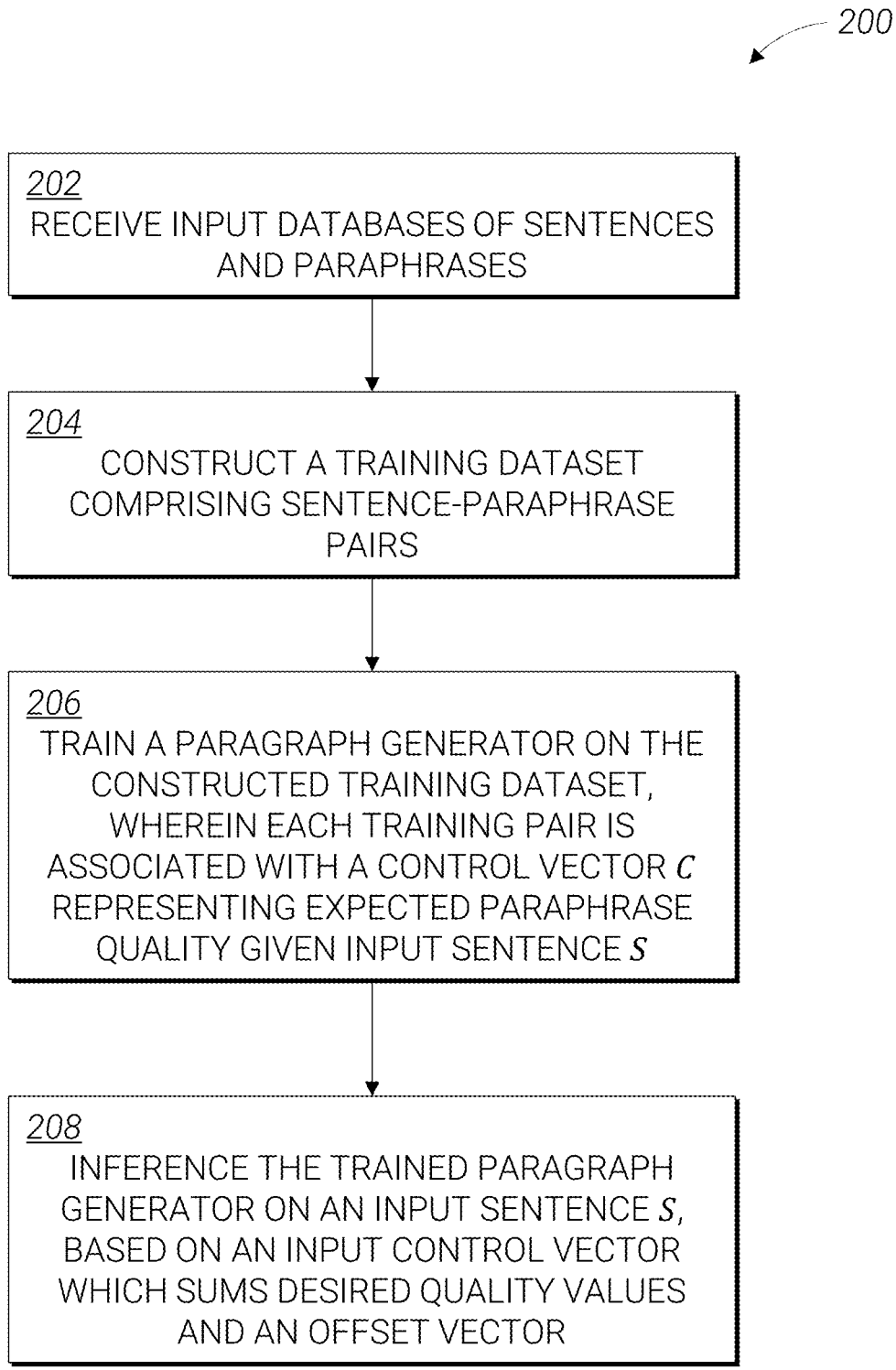
FIG. 2 is a flowchart of a method for training a quality-controlled paraphrase generator which allows for direct control of the quality of the generated paraphrases, in accordance with an embodiment of the present technique.

The instructions of paraphrase generator 300 are now discussed with reference to the flowchart of FIG. 2, which illustrates a method 200 for training a quality-controlled paraphrase generator which allows for direct control of the quality of the generated paraphrases, as may be realized by paraphrase generator 300 shown in FIG. 1.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by computer 101 of FIG. 1, and/or by any other applicable component of computing environment 100), unless specifically stated otherwise.

By way of overview, the present paraphrase generator may be based on an encoder-decoder model trained on the task of controlled paraphrase generation. Given an input sentence s and a control vector $c(s)$ representing input quality constraints along three dimensions (semantic similarity, syntactic distance, and lexical distance), the goal of the present paraphrase generator is to generate an output paraphrase s'(s, c) that conforms to the constraints represented by c. In some embodiments, the present paraphrase generator is trained using a training dataset comprising training pairs of sentence and target paraphrase (s, t), by setting c to be q(s, t), and maximizing P(t|s, c=q(s, t)) over the training set via autoregressive cross entropy loss.

In the following discussion, the criteria used for measuring paraphrase quality are the semantic, syntactic and lexical dimensions. Thus, given a sentence s and its paraphrase s', the paraphrase quality is defined as a three-dimensional vector—

$$q(s,s')=(q_{sem}(s,s'),q_{syn}(s,s'),q_{lex}(s,s')),$$

where $q_{sem}$ is a measure of semantic similarity, and $q_{syn}$ and $q_{lex}$ are measures of syntactic and lexical variation, respectively.

In the following discussion, the syntactic quality score, $q_{syn}(s, s')$ may be defined as the normalized tree edit distance (see, e.g., Kaizhong Zhang and Dennis Shasha. 1989. Simple fast algorithms for the editing distance between trees and related problems. SIAM journal on computing, 18 (6): 1245-1262) between the third level constituency parse-trees of s and s', after removing the tokens to increase the decoupling from the lexical distance metric.

The lexical quality score $q_{lex}(s, s')$ may be defined as the normalized character-level minimal edit distance between a bag-of-words representations of s and s', wherein a sentence is represented as the bag of its words, disregarding grammar and word order. Because this measure is independent of word order, it tends to further increase the decoupling from syntactic measures. Additionally, calculating the token distances on the character level enables to capture tokens that share the same stem/lemma. Character-level distance is also more robust to typos that may be found in noisy data.

The semantic quality score $q_{sem}(s, s')$ methodology was based on measuring agreement between several candidate metrics and human judgments. The present inventors have found that the Bleurt score (see Thibault Sellam, et al. 2020. BLEURT: Learning robust metrics for text generation. In Proceedings of the 58th Annual Meeting of the Association for Computational Linguistics, pages 7881-7892, Online. Association for Computational Linguistics) represents the highest correlation with human judgments. Accordingly, $q_{sem}(s, s')$ may be defined as the Bleurt score, normalized using the sigmoid function to ensure a uniform range of values, [0,1], for all three quality dimensions. For ease of presentation all metrics are presented on a 0-100 scale.

With reference back to FIG. 2, method 200 begins in step 202, wherein paraphrase generator 300 receives as input one or more source databases comprising sentences and their associated paraphrases.

In one exemplary implementation, the present inventors compiled input data obtained from one or more of the following public source databases. In some embodiments, these databases represent input data is of mixed quality which contains only a relatively small amount of high quality paraphrases:

Microsoft Common Objects in Context (MS COCO): The MS COCO dataset is a large-scale object detection, segmentation, key-point detection, and captioning dataset. The dataset consists of a large number of images with labeled captions comprising natural language descriptions of the images. For purposes of constructing a training dataset of sentences and their paraphrases, the present inventors considered different captions of the same image as paraphrases.

Answers.com: Answers.com (formerly known as WikiAnswers) is an Internet-based knowledge exchange. It comprises a corpus of clusters of questions tagged by users into clusters based on similarity. On average, each cluster has 25, and in total, the corpus contains more than 70 million question pairs.

ParaBank: ParaBank is a large-scale English paraphrase dataset. The dataset is generated using a Czech-English neural machine translation system to generate novel paraphrases of English reference sentences. The process applies lexical constraints to produce multiple high-quality sentential paraphrases per source sentence, yielding an English paraphrase resource with an average of 5 paraphrases in every cluster, and close to 100 million pairs in total.

In step 204, paraphrase generator 300 may be configured to randomly sub-sample one or more of the source databases received in step 202, to obtain a training dataset comprising a plurality of training set pairs source sentence-target paraphrase (s, t).

In some embodiments, the resulting subset training set pairs (s, t) may be split into training, validation, and test sets. In some embodiments, the training, validation, and test sets are selected such that there are no two pairs selected from the same cluster in the training, validation, and test sets.

In some embodiments, in step 206, paraphrase generator 300 may be configured to train quality predictor 304 and paraphrase generation module 306 on the training dataset obtained in step 204.

In some embodiments, paraphrase generation module 306 comprises an encoder-decoder trained on the task of controlled paraphrase generation, such that given an input sentence s and a control vector $c=(c_{sem}, c_{syn}, c_{lex})$, it output s paraphrase s'(s, c) that conforms to the quality constraints of c.

In one exemplary implementation, paraphrase generation module 306 may be based on a T5 pre-trained base model configured to perform text-to-text tasks (see, e.g., Colin Raffel, et al. 2020. Exploring the limits of transfer learning with a unified text-to-text transformer. Journal of Machine Learning Research, 21 (140): 1-67. ).

In some embodiments, the base model may then be trained over the training dataset constructed in step 204. In some embodiments, during the training process, a control input vector c(s) representing input quality constraints along three dimensions (semantic similarity, syntactic distance, and lexical distance) is associated with each training set pair of source sentence-target paraphrase (s, t). In some embodiments, the control vector c is set to be equal to the expected quality q(s, t) given input sentence s, to maximize the quality distribution P(t|s, c=q(s, t)) over the training set.

In some embodiments, the control input vector c is quantized at each of its three dimensions into 20 equally-spaced values ranging from 0 to 100, wherein each value is assigned to a special saved-token. The three tokens corresponding to the quantized values of the control vector c are then concatenated to the head of the input sentence s of each training set pair of source sentence-target paraphrase (s, t), and together are used as input to the model during training.

In some embodiments, paraphrase generator 300 may be configured to train quality predictor 304. In some embodiments, quality predictor 304 is a regressor configured to predict an expected quality $q_0(s)$ of an input sentence s. Accordingly, for a given input sentence s, the output of quality predictor 304 is $r(s)=(r_{sem}(s), r_{syn}(s), r_{lex}(s))$.

In some embodiments, during training of the present paraphrase generator model, quality predictor 304 aims to predict the expected typical quality q(s, t) given s, for each training pair (s, t).

In one exemplary implementation, quality predictor 304 may be based on an Electra base model (see, e.g., Kevin Clark, et al. Electra: Pre-training text encoders as discriminators rather than generators. arXiv preprint arXiv: 2003.10555) fine-tuned with MSE loss to predict the typical quality values.

In some embodiments, in step 208, a trained paraphrase generator of the present technique may be applied to an input sentence s, to generate one or more quality-controlled paraphrases s'.

Figure 3:
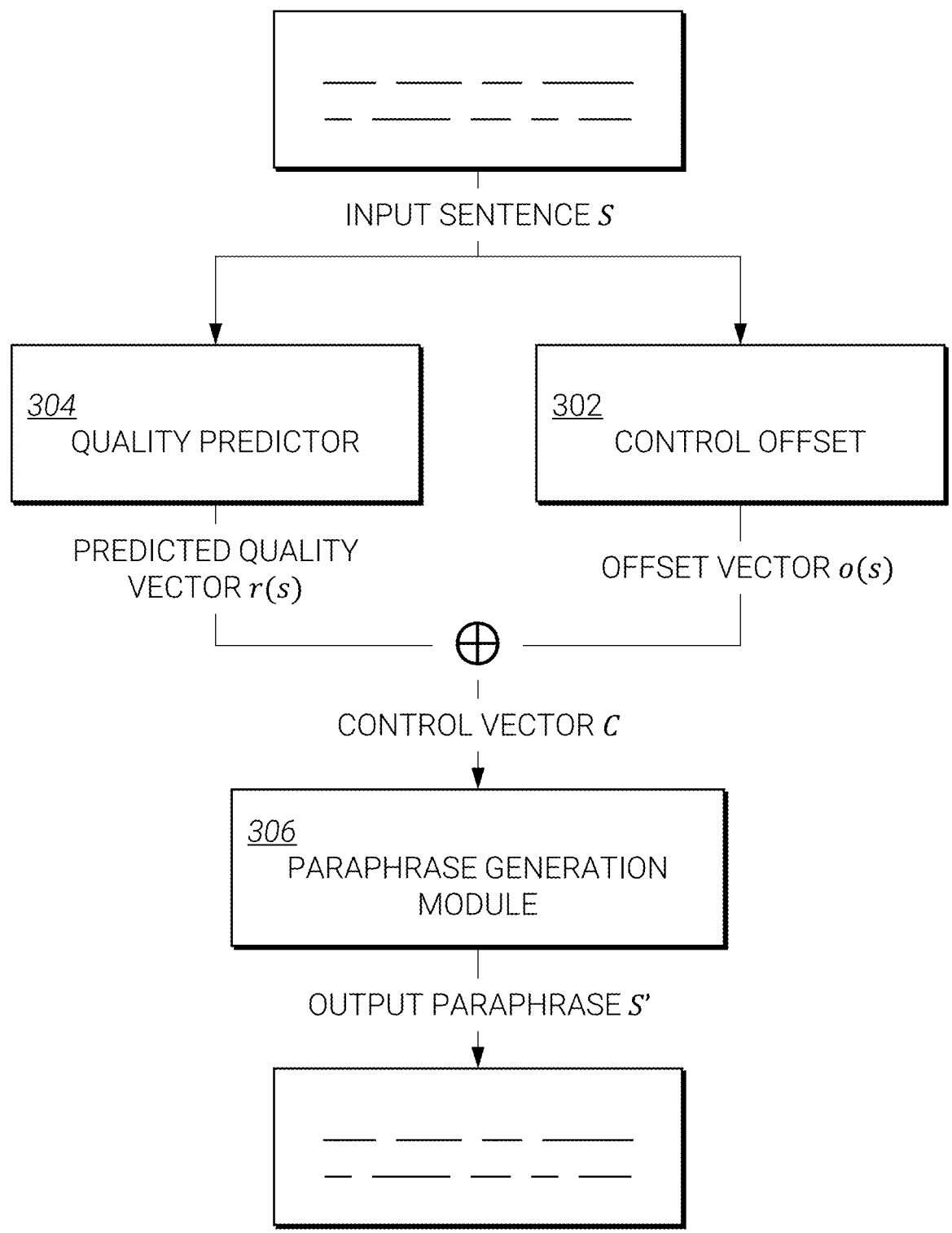
FIG. 3 schematically depicts an architecture of an exemplary paraphrase generation model for quality controlled paraphrase generation, in accordance with an embodiment of the present technique.

FIG. 3 schematically depicts an architecture of an exemplary paraphrase generation model for quality controlled paraphrase generation, as may be realized by paraphrase generator 300 shown in FIG. 1.

As can be seen in FIG. 3, during an inference stage, the trained paraphrase generator of the present technique may be applied to an input sentence s. A control offset, such as control offset module 302 of paraphrase generator 300, may be adjusted by a user to set the requested quality values $q(s)=(q_{sem}, q_{syn}, q_{tex})$ of the three quality dimensions of the desired output—semantic similarity, and syntactic and lexical distances.

In some embodiments, quality predictor 304 may then predict an expected quality r(s) of the paraphrases of input sentence s. In some embodiments, paraphrase generator 300 may then generate a control vector $c=(c_{sem}, c_{syn}, c_{tex})$, which is a sum of r(s) and an offset vector $o=(o_{sem}, o_{syn}, o_{tex})$ which is equal to the differential between the requested quality vector $q(s)=(q_{sem}, q_{syn}, q_{tex})$ and expected quality r(s).

By way of background, as noted above, not all paraphrase qualities are achievable for any given input sentence. Accordingly, the present technique modifies and adjusts the requested control values based on a predicted paraphrase quality associated with the input sentence. In some embodiments, this adjustment assumes that the quality distribution p(q|s) of all paraphrases of sentence s is approximately normally distributed around a sentence-dependent mean $q_0(s)$, and that the variance is approximately sentence-independent. It may be further assumed that given an input sentence s, the difficulty to generate a paraphrase of a requested quality q is dominated by the quality distribution p(q|s) rather than by the requested quality vector q itself.

Accordingly, the level of difficulty to generate a paraphrase of a requested quality q can be expressed by an offset value, $o=(o_{sem}, o_{syn}, o_{lex})$, which represent a differential of request quality vector q from predicted quality vector $q_0(s)$. Thus, the input control, c(s) is the sum of $q_0(s)$ and offset o. This method defines sentence-aware quality control by decomposing the input control, c, into a sum of a sentence dependent reference point, r(s), and a sentence independent offset, o.

In some embodiments, paraphrase generation module 306 receives as input sentence s and control vector $c=(c_{sem}, c_{syn}, c_{tex})$, and outputs a paraphrase s'.

Experimental Results

The present inventors conducted an analysis to study the level of control achieved by the present paraphrase generator, by measuring the responses of the present paraphrase generator to changes in the input offsets. The measurements were performed using the validation set constructed in step 204 of method 200 as detailed hereinabove, by calculating the expected difference in paraphrase quality as a result of applying an input offset o, compared to a baseline reference of zero offset.

The analysis was performed with respect to each of the quality dimensions separately, i.e., how changing the input offset along a given quality dimension dim (the controlled dimension), while keeping the two other dimensions constant, affects the responsiveness in each of the three dimensions. It is expected that the present control mechanism would provide that increasing the input offset in one dimension will result in a monotonically increasing responsiveness in that dimension, with none or relatively small responsiveness in the other two dimensions.

Accordingly, a three-dimensional responsiveness vector of the present paraphrase generator may be defined as an offset o, R(o) as Q(o)−Q((0,0,0)), where Q(o) is the expected quality of the paraphrases generated by the model at an offset o. Q(o) may be estimated by averaging q(QCPG (s,r(s)+o)) over the input sentences s of the validation set, wherein the estimated value may be denoted by $\tilde{Q}(o)-(\tilde{Q}_{sem}(o), \tilde{Q}_{syn}(o), \tilde{Q}_{lex}(o))$, and the corresponding estimate of R(o) by $\tilde{R}(o)$.

Figure 4A:
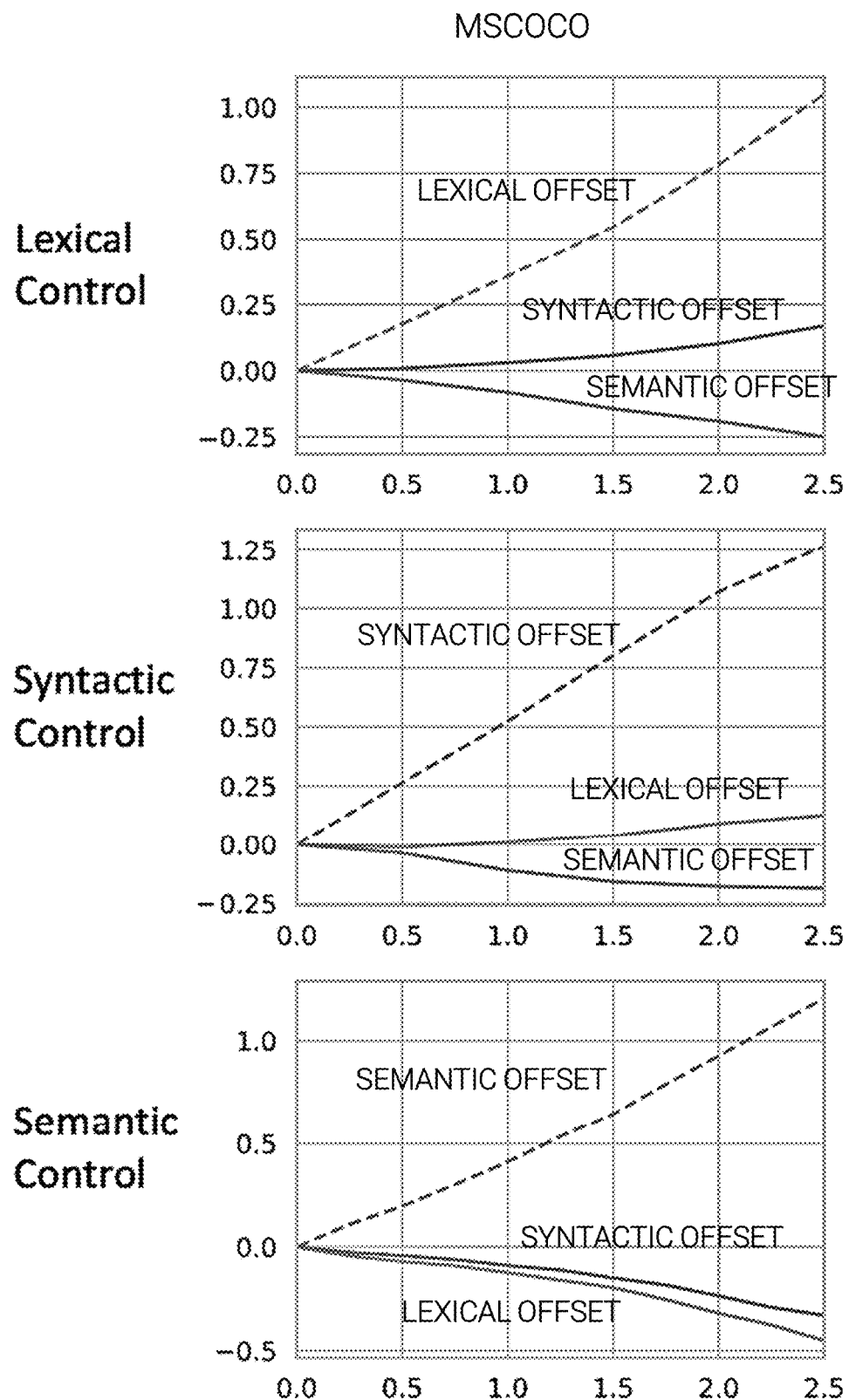
FIGS. 4A-4D show graphs of experimental results.
Figure 4B:
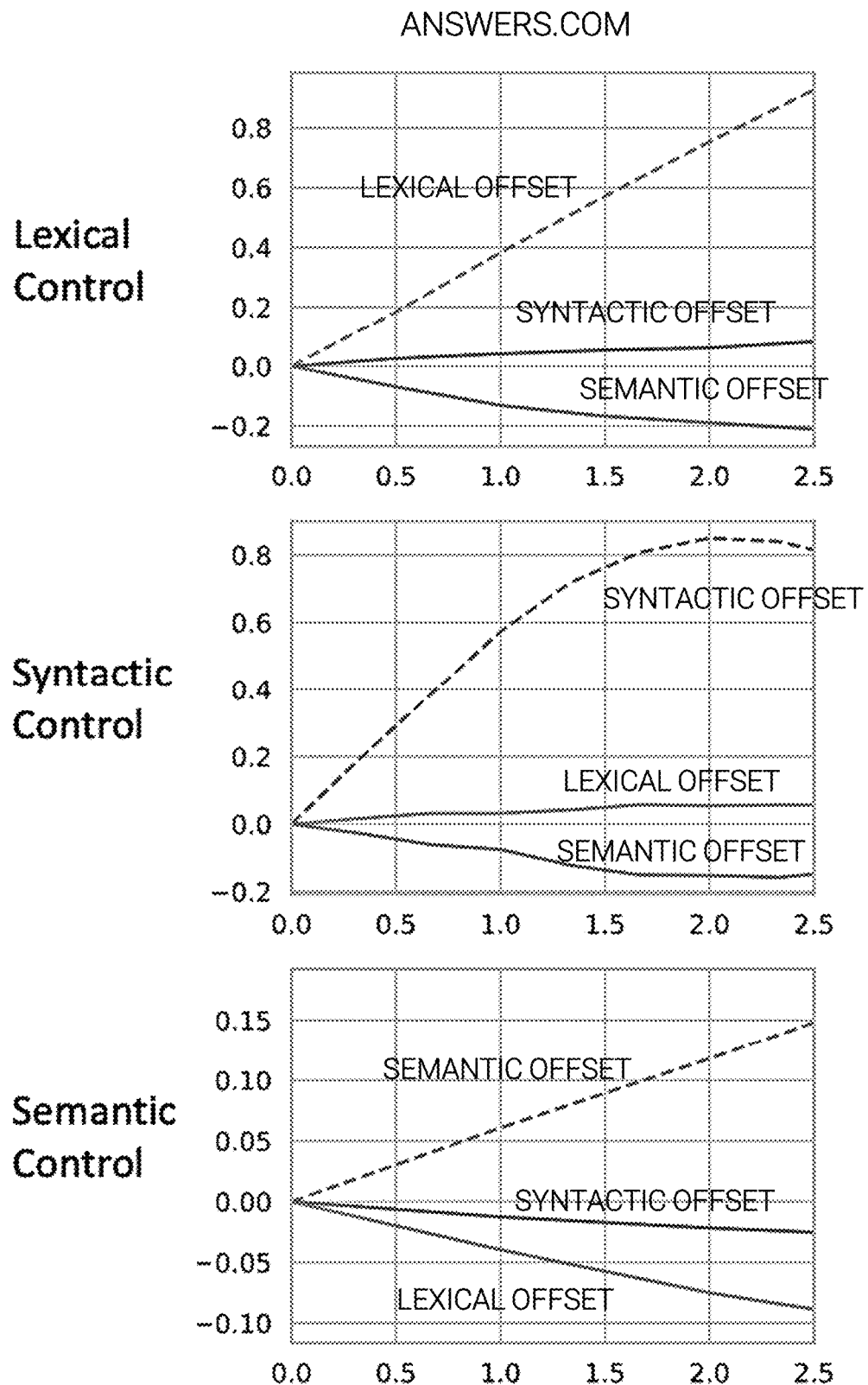
Figure 4C:
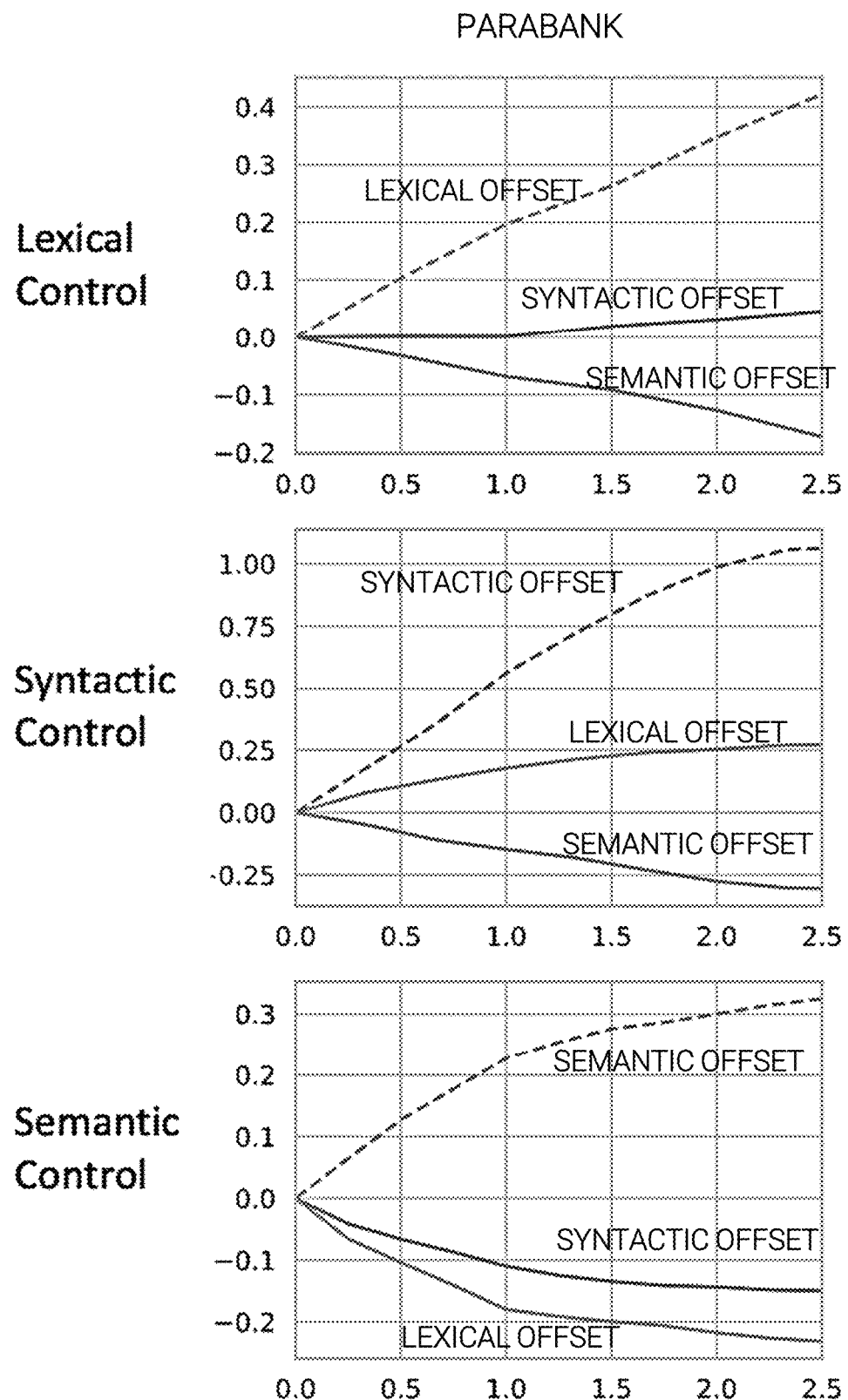

FIGS. 4A-4C show, respectively for each of the three datasets detailed in step 202 of method 200, the responsiveness in the three quality dimensions, when changing the input offset along each of the three dimensions, while fixing the input offsets in the other two dimensions at 0. Examining the actual values of quality in the paraphrases of the validation datasets, reveals that the standard deviation is different in each dimension. Accordingly, the input offset values and the responsiveness in units of standard deviation as measured in the respective dimension and validation set.

For the range of offsets displayed in FIGS. 4A-4C, the responsiveness in the controlled dimension increases monotonically with the input offsets across all datasets and dimensions. However, as expected, the responsiveness in the uncontrolled dimensions does fall to zero, due to the inherent coupling between the dimensions. For example, many changes that increase syntactic diversity, also increase lexical diversity (e.g., a move from passive to active voice). Still, it is shown that the present control mechanism is able to increase the responsiveness in the controlled dimension with relative low responsiveness in the uncontrolled dimensions. Specifically, focusing on the relation between semantic similarity and expression diversity, FIGS. 4A-4C show that there is a minor decrease in semantic similarity in response to an increase in lexical and syntactic diversity.

Figure 4D:
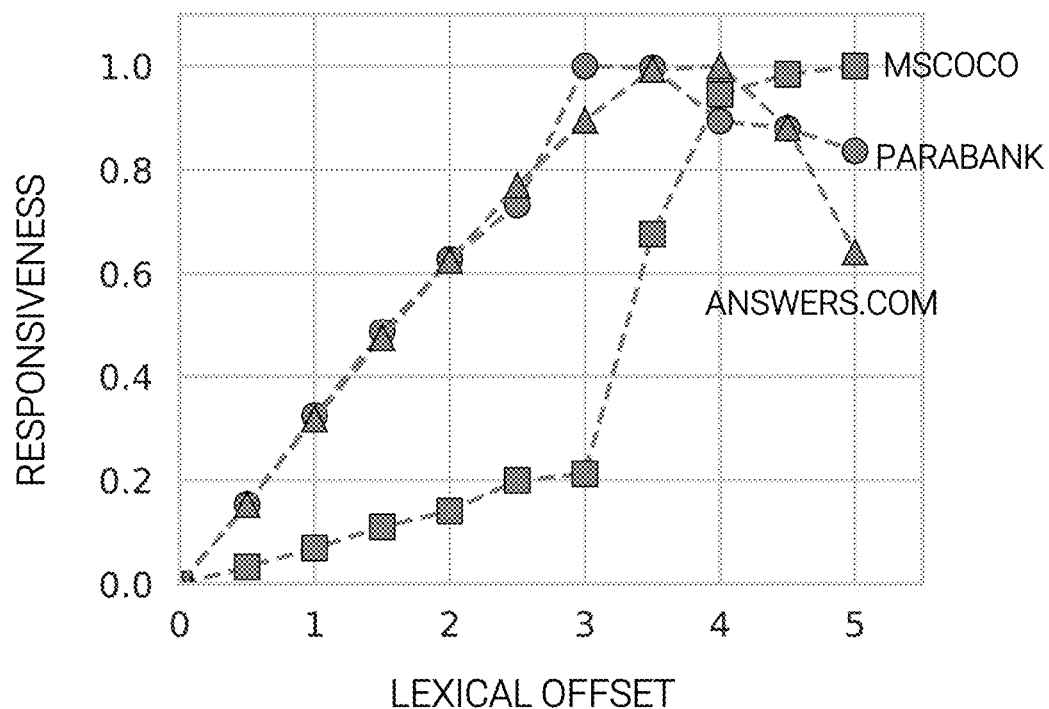
Figure 4D:
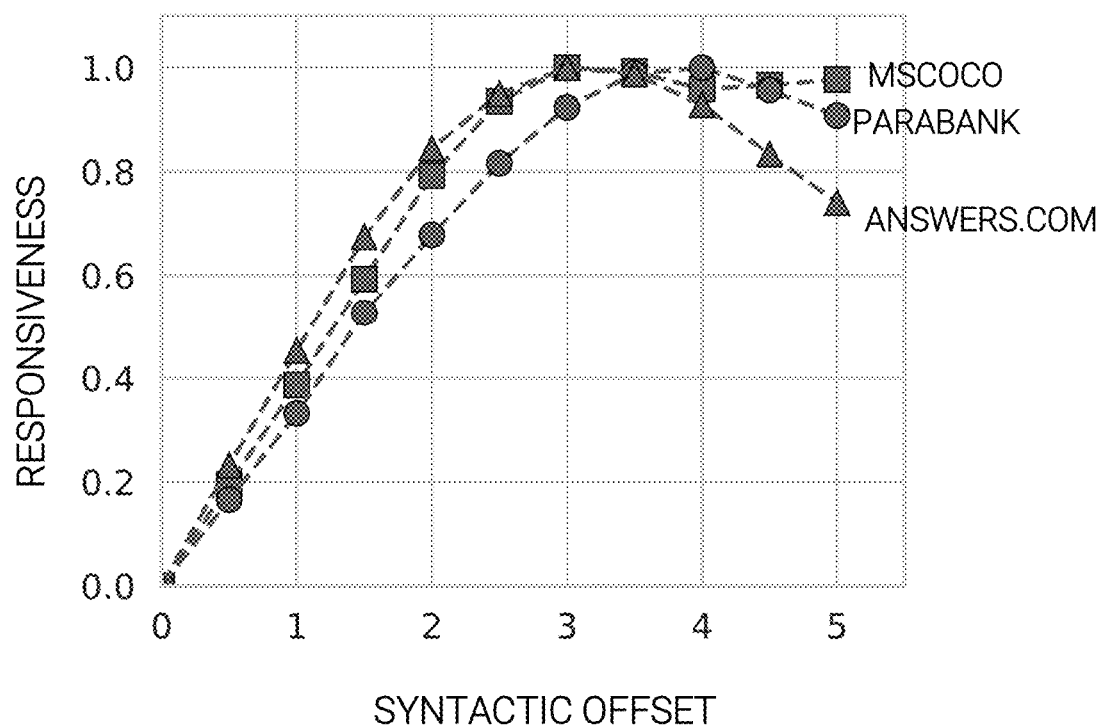

FIGS. 4A-4C focused on small to moderate input offsets, e.g., offsets of up to 2 standard deviations from the reference point. However, it is expected that with increasing offsets, e.g., when the requested control value increasingly deviates from the predicted quality value, it becomes increasingly difficult to generate a paraphrase that conforms to the requested control value. FIG. 4D depicts the responsiveness in the syntactic and lexical dimensions for a larger range of offset values. For the semantic dimension, the typical values are too high to allow large positive offsets, which for most sentences result in exceeding the upper limit of the semantic score. Indeed, as can be seen in FIG. 4D, when moving to high offset values, the responsiveness in the syntactic and lexical dimensions starts to decrease. This behavior is in line with the aforementioned expectation, and reflects the detrimental effect of feeding the present paraphrase generator with input control values that are too distant from the typical paraphrase qualities of the input sentence.

Selecting Optimal Input Control Values

In some embodiments, the present technique provides for a method for optimizing the expected quality of the paraphrases generated by a paraphrase generator of the present technique, such as the trained paraphrase generator 300 as trained according to method 200 detailed hereinabove.

In some embodiments, the present method provides for predicting input control quality values, c(s), that optimize the expected quality of the paraphrases generated by the present paraphrase generator, given an input sentence. In some embodiments, the present method selects input offsets that are expected to yield the desired quality of paraphrases, given requested quality values. Accordingly, the present method calculates the estimated expected quality, $\tilde{Q}(o)$, for each input offset o, using the validation set constructed in step 204 of method 200, as detailed hereinabove. Then, the present method searches a 3D grid of input offsets, to find the point for which $\tilde{Q}(o)$ is best aligned with the requested quality values. In some embodiments, the present method may be a preliminary step, in which a user selects input control parameters that are optimized to achieve a desired paraphrasing operation point, and then uses the selected values at as input when inferencing a trained paraphrase generator of the present technique.

Figure 5A:
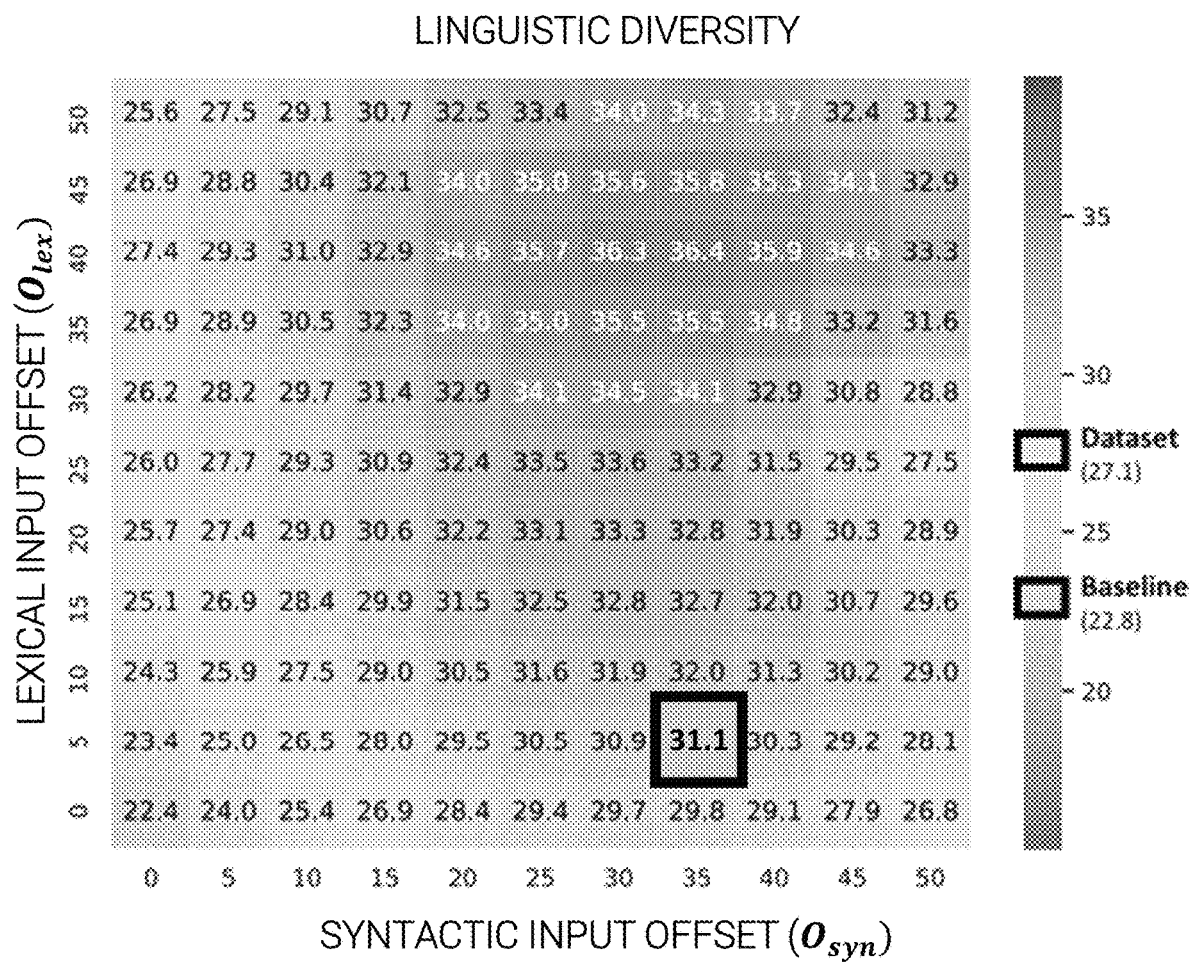
FIGS. 5A-5B show heatmaps of experimental results.
Figure 5B:
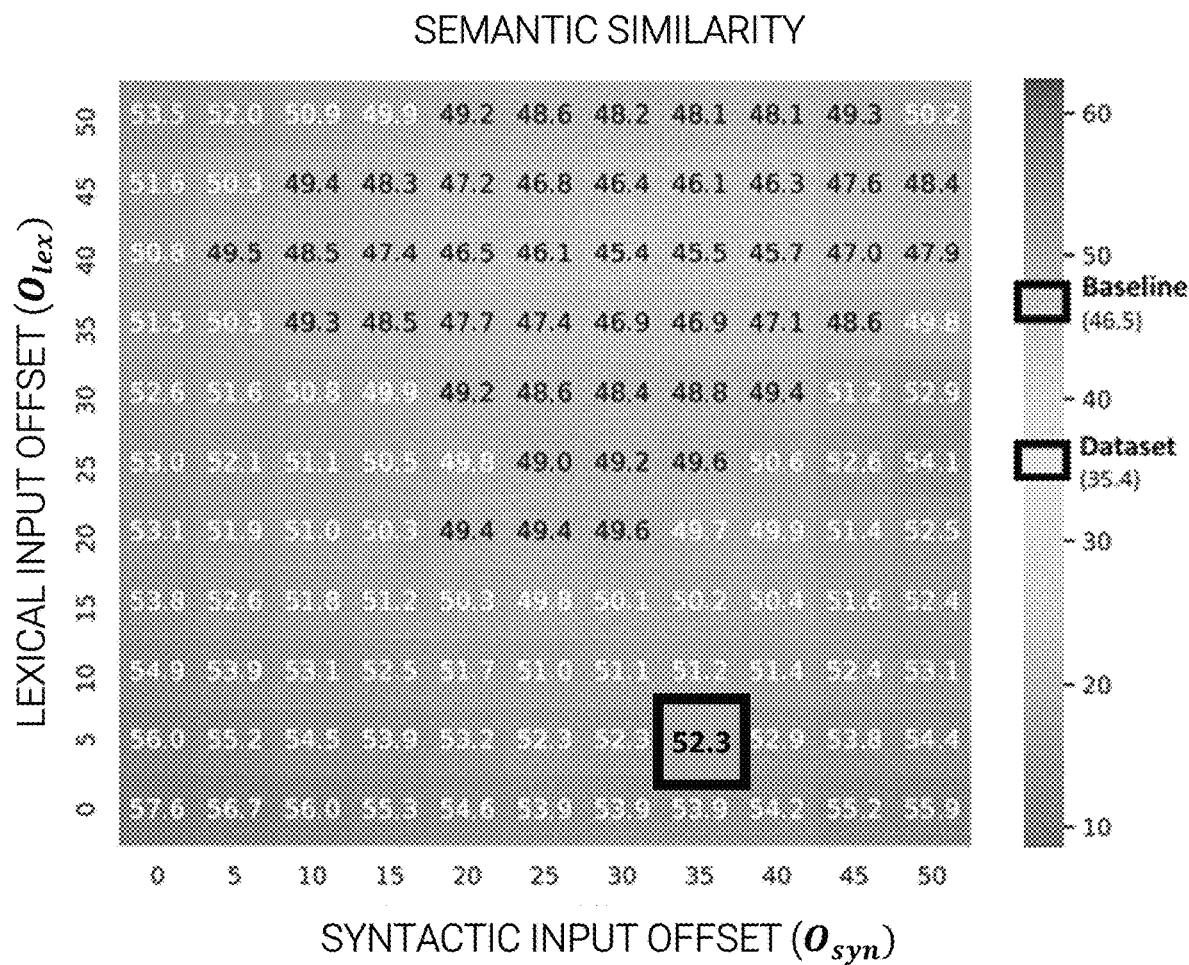

FIGS. 5A-5B show the estimated quality value $\tilde{Q}(o)$ at different offset values for the Answers.com database. Average of linguistic diversity (FIG. 5A) and semantic similarity (FIG. 5B) of the paraphrases generated for the validation dataset sentences, as a function of the syntactic input offset $o_{syn}$ and lexical input offset $o_{lex}$ (with values for both ranging from 0-50), wherein the semantic input offset $o_{sem}$ is set at a fixed value of 50.

As expected, the two measures are anti-correlated, where areas with increased semantic similarity are characterized by decreased linguistic diversity. The results are compared to two reference points, which are invariant to o and are marked on the side bars with black squares: 'Dataset' is the semantic-similarity/linguistic-diversity average value over the corresponding validation dataset paraphrases, and 'Baseline' is the average semantic-similarity/linguistic-diversity of an uncontrolled baseline model over the corresponding validation dataset. Notice that the average diversity level achieved by the uncontrolled baseline model is lower than that of the validation dataset mean, reflecting the difficulty of the uncontrolled baseline model to generate diverse paraphrases. On the other hand, the present paraphrase generator, having suitable input offset values, is able to generate paraphrases which are on average higher than the baseline model both in their linguistic diversity and in their semantic similarity, and may be higher in many cases than the values of the ground truth paraphrases in the validation set.

In general, the estimates of the expected quality achieved by the present paraphrase generator at different input offsets, allows a user to generate paraphrases at different operation points, by manipulating the input offset control o to meet desired quality values. Consider for example a typical use case of aiming to maximize linguistic diversity under a constraint on semantic similarity. An example of such a case is an operation point, denoted in Figured 5A-5B by black rectangles, which aims to exemplify the advantage of the present paraphrase generator over the baseline model, by maximizing linguistic diversity under the constraint that the semantic similarity is at least 5 points higher than the baseline model. The input offset values to obtain this operation point depend on the dataset, and can be found using heatmaps such as in FIGS. 5A-5B. For the Answers.com database, the input offset for the operation point values are ($o_{sem}$=50, $o_{syn}$=35, $o_{lex}$=5).

The present inventors further evaluated the quality of generated paraphrases using the paraphrase generator of the present technique, based on the three quality measures used in the control of the present paraphrase generator, as well as Self-BLEU (see, e.g., Yaoming Zhu, et al. 2018. Texygen: A benchmarking platform for text generation models. SIGIR.), which aims to measure the linguistic diversity in generated paraphrases by penalizing copying from input sentences. In the results reported in Table 1 below, the semantic similarity ($q_{sem}$), syntactic diversity ($q_{syn}$) and lexical diversity ($q_{lex}$), are measured as indicated hereinabove, using Bleurt, Tree edit distance, and character-level edit distance, respectively. The present model uses the operation point defined with reference to FIGS. 5A-5B above.

TABLE 1

|  | MSCOCO | | | | Answers.com | | | | ParaBank | | | |
| --- | --- | --- | --- | --- | --- | --- | --- | --- | --- | --- | --- | --- |
|  | $q_{sem}$ | $q_{syn}$ | $q_{lex}$ | Self-BLEU | $q_{sem}$ | $q_{syn}$ | $q_{lex}$ | Self-BLEU | $q_{sem}$ | $q_{syn}$ | $q_{lex}$ | Self-BLEU |
| Ground Truth | 29.9 | 34.5 | 28.0 | 8.7 | 34.6 | 30.7 | 24.4 | 16.4 | 75.0 | 18.5 | 20.9 | 23.9 |
| Baseline Model | 50.0 | 27.8 | 23.0 | 18.8 | 46.6 | 24.7 | 20.9 | 23.4 | 77.8 | 16.8 | 18.6 | 29.4 |
| Present Model | 56.6 | 29.6 | 42.4 | 18.0 | 48.5 | 41.5 | 24.8 | 21.4 | 81.4 | 18.9 | 19.6 | 27.1 |

As can be seen in Table 1, the present paraphrase generator outperforms the baseline model in all metrics across all datasets, as predicted using the validation dataset heatmaps. A clear advantage is obtained even for the Self-BLEU criterion, which was not part of the metrics used as input controls. Importantly, the quality of the paraphrases generated by the present paraphrase generator is comparable to, or at times better than the quality of the paraphrases in the ground truth of the datasets. Examples of paraphrases generated by the present paraphrase generator compared to the ground truth paraphrases appear in Tables 2A, 2B, and 2C below.

TABLE 2A

MSCOCO DATABASE

| Source | Ground-truth | Present Model |
|---|---|---|
| A table filled with assorted prepared foods in a buffet fashion. | Fresh fruits, vegetables, and other foods are spread out on the table. | A table with food on it in a buffet line. |
| Ornately decorated assortment of vases displayed on shelf. | A display of pottery in a glass case | A decorated shelf with vases on display |
| Group of people seated at a long table eating pizza | A group of people are sitting around a wooden table. | A group of people sitting at a long table with pizza. |
| A building with a clock and weather vane is outlined against the blue sky. | a building with a clock inside of it | A clock and weather vane on a blue sky. |
| A knitted teddy bear hanging off an Afghan | A blue crocheted teddy bear hanging off of a crocheted blanket | A knitted teddy bear hanging from a quilt |
| Two men pose next to a huge vase with an owl painted on it. | a big vase sits in the middle of a couple of people | Two men standing next to a large vase with an owl on it. |

TABLE 2B

Answers.com

| Source | Ground-truth | Present Model |
|---|---|---|
| What temperature scale do you use in australia? | Temperature scale used for scientific work? | What is the temperature scale for Australia? |
| Are there any other names for tay sachs disease? | Who is warren tay and bernard sachs? | Other names for tay sachs disease? |
| What should you give to your elder sister on her birthday? | What should you get your little sister for her 9th birthday? | Your older sister's birthday what to give? |
| How changes in the respiration rate affect blood pH? | How does Increase in respiration of water affect pH? | Explain how the respiration rate affects the pH? |
| What is the value of a dollar bill signed by joseph w barr? | What is the value of a dollar bill 1963 signed by joseph barr? | Joseph W Barr dollar bill value? |
| What are the three meninges that cover the brain and spinal cord? | The three memebranous coverings that protect the brain and spinal cord? | What three meninges cover the brain and spinal cord? |

TABLE 2C

ParaBank

| Source | Ground-truth | Present Model |
|---|---|---|
| We're having trouble with Roger. | I've got issues on Roger. | We have a problem with Roger. |
| Everything on schedule. | All on schedule. | All in the plan. |
| The internet no longer maked the distance matter: the world may indeed be our classroom. | Because of the Internet, distance doesn't matter anymore: the world may indeed be an our classroom. | The Internet doesn't matter: the world could be our school. |
| Article 2 deals with the scope of application of a directive extending cooperation between Member States to include taxes of whatever type. | Article 2 concerns an area which is covered by a Directive which broadens cooperation among Member States so as that it covers taxes of any kind. | Article 2 concerns the scope of the directive extending the cooperation between the Member States to include taxation of any kind. |
| You're free to move forward. | You're free to move on. | You can go on. |

Additionally, the present inventors evaluated the effect of the quality guidance on the ability of the present paraphrase generator to predict the ground truth paraphrases. Tables 3 and 4 below show the BLEU scores (see, e.g., Kishore Papineni, et al. 2002. Bleu: a method for automatic evaluation of machine translation. In Proceedings of the 40th Annual Meeting of the Association for Computational Linguistics, pages 311-318, Philadelphia, Pennsylvania, USA. Association for Computational Linguistics), obtained by the present paraphrase generator and the uncontrolled baseline model, respectively. The results verify that the input quality vectors induced by the target sentences are effectively utilized by the present paraphrase generator to achieve better prediction performance.

TABLE 3

| Dataset | LR | Validation BLEU | Validation Loss | Train Loss |
|---|---|---|---|---|
| MSCOCO | 1e-3 | 11.14 | 2.01 | 1.47 |
| | 1e-4 | 11.24 | 1.80 | 1.61 |
| | 5e-3 | 0.00 | 2.29 | 2.89 |
| | 5e-4 | 10.86 | 1.98 | 1.46 |
| ParaBank2 | 1e-3 | 32.03 | 1.28 | 0.60 |
| | 1e-4 | 34.28 | 1.05 | 0.65 |
| | 5e-3 | 0.00 | 3.37 | 3.86 |
| | 5e-4 | 32.77 | 1.25 | 0.56 |
| Answers.com | 1e-3 | 17.29 | 2.08 | 1.40 |
| | 1e-4 | 19.48 | 1.81 | 1.52 |
| | 5e-3 | 0.00 | 3.57 | 4.01 |
| | 5e-4 | 18.21 | 1.99 | 1.36 |

TABLE 4

| Dataset | LR | Validation BLEU | Validation Loss | Train Loss |
|---|---|---|---|---|
| MSCOCO | 1e-3 | 11.14 | 2.01 | 1.47 |
| | 1e-4 | 11.24 | 1.80 | 1.61 |
| | 5e-3 | 0.00 | 2.29 | 2.89 |
| | 5e-4 | 10.86 | 1.98 | 1.46 |
| ParaBank | 1e-3 | 32.03 | 1.28 | 0.60 |
| | 1e-4 | 34.28 | 1.05 | 0.65 |
| | 5e-3 | 0.00 | 3.37 | 3.86 |
| | 5e-4 | 32.77 | 1.25 | 0.56 |
| Answers.com | 1e-3 | 17.29 | 2.08 | 1.40 |
| | 1e-4 | 19.48 | 1.81 | 1.52 |
| | 5e-3 | 0.00 | 3.57 | 4.01 |
| | 5e-4 | 18.21 | 1.99 | 1.36 |

The present inventors further evaluated semantic similarity using human annotation. A sample of 50 source sentences from each test database was selected. Then, paraphrases were generated using an uncontrolled baseline model and the present paraphrase generator. The annotators were shown the source sentence, along with the two generated paraphrases (randomly ordered), and were asked which of the two better preserves the semantic meaning of the source sentence. In total, 150 triplets were evaluated by 5 judges. Table 5 below demonstrates an advantage for the present paraphrase generator in all datasets, with a large margin in MSCOCO and Answers.com. This advantage is statistically significant (p-value <0.05) as obtained by applying the Wilcoxon signed-rank test to the difference between the number of annotators that voted for the present paraphrase generator and those voted for the baseline model, across all datasets. Thus, the human evaluation is in line with the results of the automatic semantic similarity measure.

TABLE 5

| | Votes | | | Agreement |
|---|---|---|---|---|
| | Present Model | Baseline Model | (Tie) | Cohen's Kappa |
| MSCOCO | .56 | .36 | (.08) | .38 |
| Answers.com | .48 | .36 | (.16) | .47 |
| ParaBank | .30 | .26 | (.44) | .57 |

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A method comprising:
receiving, as input, a dataset comprising a plurality of training pairs, wherein each of the plurality of training pairs includes a source sentence and a target paraphrase of the source sentence;
training, at a training stage, a machine learning model on the dataset to generate a trained quality-controlled paraphrase generator model, wherein during the training stage each of the plurality of training pairs are associated with a predicted control vector representing a predicted paraphrase quality of the source sentence; and
inferencing, at an inference stage, the trained quality-controlled paraphrase generator model on an input sentence, wherein the input sentence includes an input quality control vector for controlling an output paraphrase, wherein the input quality control vector is a three-dimensional vector including three quality dimensions, a desired semantic similarity, a desired syntactic distance, and a desired lexical distance, and wherein requested quality values of the three quality dimensions are set by a user.

2. The method of claim 1, further comprising:
generating the input quality control vector, wherein the input quality control vector is a sum of an expected quality values and an offset vector, wherein the vector is a differential between the requested quality values set by the user and the expected quality values.

3. The method of claim 2, wherein the machine learning model includes a quality predictor configured to predict the expected quality values of paraphrases of a sentence.

4. The method of claim 3, wherein the quality predictor is a regressor configured to predict the expected quality values of the input sentence.

5. The method of claim 2, wherein the offset vector represents a sentence-independent level of difficulty generating paraphrases for the input sentence.

6. The method of claim 1, further comprising:
adjusting the requested quality values set by the user based on a predicted paraphrase quality associated with the input sentence.

7. The method of claim 6, wherein the adjustment assumes that a quality distribution of all paraphrases of the input sentence are normally distributed around a sentence-dependent mean and a variance is independent, and wherein, given the input sentence, a difficulty to generate a paraphrase of the requested quality values is dominated by the quality distribution rather than the requested quality values.

8. A computer system comprising:
a processor set;
one or more computer-readable storage media; and
program instructions stored on the one or more computer-readable storage media to cause the processor set to perform operations comprising:
receiving, as input, a dataset comprising a plurality of training pairs, wherein each of the plurality of training pairs includes a source sentence and a target paraphrase of the source sentence;
training, at a training stage, a machine learning model on the dataset to generate a trained quality-controlled paraphrase generator model, wherein during the training stage each of the plurality of training pairs are associated with a predicted control vector representing a predicted paraphrase quality of the source sentence; and
inferencing, at an inference stage, the trained quality-controlled paraphrase generator model on an input sentence, wherein the input sentence includes an input quality control vector for controlling an output paraphrase, wherein the input quality control vector is a three-dimensional vector including three quality dimensions, a desired semantic similarity, a desired syntactic distance, and a desired lexical distance, and wherein requested quality values of the three quality dimensions are set by a user.

9. The computer system of claim 8, wherein the operations further comprise:
generating the input quality control vector, wherein the input quality control vector is a sum of an expected quality values and an offset vector, wherein the vector is a differential between the requested quality values set by the user and the expected quality values.

10. The computer system of claim 9, wherein the machine learning model includes a quality predictor configured to predict the expected quality values of paraphrases of a sentence.

11. The computer system of claim 10, wherein the quality predictor is a regressor configured to predict the expected quality values of the input sentence.

12. The computer system of claim 9, wherein the offset vector represents a sentence-independent level of difficulty generating paraphrases for the input sentence.

13. The computer system of claim 8, wherein the operations further comprise:
adjusting the requested quality values set by the user based on a predicted paraphrase quality associated with the input sentence.

14. The computer system of claim 13, wherein the adjustment assumes that a quality distribution of all paraphrases of the input sentence are normally distributed around a sentence-dependent mean and a variance is independent, and wherein, given the input sentence, a difficulty to generate a paraphrase of the requested quality values is dominated by the quality distribution rather than the requested quality values.

15. A computer program product comprising:
one or more computer-readable storage media; and
program instructions stored on the one or more computer-readable storage media to perform operations comprising:
receiving, as input, a dataset comprising a plurality of training pairs, wherein each of the plurality of training pairs includes a source sentence and a target paraphrase of the source sentence;
training, at a training stage, a machine learning model on the dataset to generate a trained quality-controlled paraphrase generator model, wherein during the training stage each of the plurality of training pairs are associated with a predicted control vector representing a predicted paraphrase quality of the source sentence; and
inferencing, at an inference stage, the trained quality-controlled paraphrase generator model on an input sentence, wherein the input sentence includes an input quality control vector for controlling an output paraphrase, wherein the input quality control vector is a three-dimensional vector including three quality dimensions, a desired semantic similarity, a desired syntactic distance, and a desired lexical distance, and wherein requested quality values of the three quality dimensions are set by a user.

16. The computer program product of claim 15, wherein the operations further comprise:
generating the input quality control vector, wherein the input quality control vector is a sum of an expected quality values and an offset vector, wherein the vector is a differential between the requested quality values set by the user and the expected quality values.

17. The computer program product of claim 16, wherein the machine learning model includes a quality predictor configured to predict the expected quality values of paraphrases of a sentence.

18. The computer program product of claim 17, wherein the quality predictor is a regressor configured to predict the expected quality values of the input sentence.

19. The computer program product of claim 16, wherein the offset vector represents a sentence-independent level of difficulty generating paraphrases for the input sentence.

20. The computer program product of claim 15, wherein the operations further comprise:
adjusting the requested quality values set by the user based on a predicted paraphrase quality associated with the input sentence.

21. The computer program product of claim 20, wherein the adjustment assumes that a quality distribution of all paraphrases of the input sentence are normally distributed around a sentence-dependent mean and a variance is independent, and wherein, given the input sentence, a difficulty to generate a paraphrase of the requested quality values is dominated by the quality distribution rather than the requested quality values.

* * * * *